(12) United States Patent
Ben Zvi et al.

(10) Patent No.: US 12,371,644 B2
(45) Date of Patent: Jul. 29, 2025

(54) MATURATION SYSTEM AND METHOD

(71) Applicant: VERSTILL DISTILLATION SYSTEMS LTD, Lehavot Habashan (IL)

(72) Inventors: Yechiel Ben Zvi, Ashdod (IL); Matan Edvy, Plainsboro, NJ (US); Ido Maor, Hashachar (IL)

(73) Assignee: Verstill Distillation Systems Ltd. (IL)

( * ) Notice: Subject to any disclaimer, the term of this patent is extended or adjusted under 35 U.S.C. 154(b) by 1025 days.

(21) Appl. No.: 16/973,290

(22) PCT Filed: Jun. 18, 2019

(86) PCT No.: PCT/IL2019/050681
§ 371 (c)(1),
(2) Date: Dec. 8, 2020

(87) PCT Pub. No.: WO2019/244152
PCT Pub. Date: Dec. 26, 2019

(65) Prior Publication Data
US 2021/0246403 A1    Aug. 12, 2021

(30) Foreign Application Priority Data

Jun. 19, 2018 (IL) .......................... 260160

(51) Int. Cl.
*C12H 1/044* (2006.01)
*B01J 23/42* (2006.01)
(Continued)

(52) U.S. Cl.
CPC ............ *C12H 1/0408* (2013.01); *B01J 23/42* (2013.01); *B01J 23/44* (2013.01); *B01J 23/50* (2013.01);
(Continued)

(58) Field of Classification Search
CPC . B01J 23/44; B01J 23/72; B01J 23/755; B01J 23/52; B01J 23/50; B01J 23/745;
(Continued)

(56) References Cited

U.S. PATENT DOCUMENTS 968,832 A * 8/1910 Carroll ..................... A22C 7/00
203/29
2,027,129 A * 1/1936 Thomas ................... C12H 1/00
426/313
(Continued)

FOREIGN PATENT DOCUMENTS

| CN | 207079218 | 3/2018 |
| GB | 428518 A | 5/1935 |
| TW | 200604339 | 7/2006 |

OTHER PUBLICATIONS

Machine translation of CN 207079218 (Year: 2018).*
(Continued)

*Primary Examiner* — Vera Stulii
(74) *Attorney, Agent, or Firm* — McAndrews, Held & Malloy, Ltd.

(57) ABSTRACT

An improved method of maturation of an unaged or partially aged distilled spirit, the method comprising: exposing the spirit to at least one catalytic material consisting of a group selected from: iron oxide nanoparticles, alumina-supported Fe(II) complexes, Pd/C, multiwalled carbon nanotubes, carbon xerogels, carbon based solid acid catalysts, $SO_4^{2-}/TiO_2/\gamma\text{-}Al_2O_3$, an element selected from the group consisting of: columns 4-12 transition metals except for Fe, column 13 boron group, Si, and mixtures thereof; wherein throughout
(Continued)

the exposing, the spirit is not being distilled, and the exposing is allowed until level of at least one maturation congener in the spirit attains predetermined desired congener level/s in the spirit.

13 Claims, 10 Drawing Sheets

(51) Int. Cl.

| | | |
|---|---|---|
| *B01J 23/44* | (2006.01) | |
| *B01J 23/50* | (2006.01) | |
| *B01J 23/52* | (2006.01) | |
| *B01J 23/72* | (2006.01) | |
| *B01J 23/745* | (2006.01) | |
| *B01J 23/755* | (2006.01) | |
| *C12H 1/16* | (2006.01) | |
| *C12H 1/18* | (2006.01) | |

(52) U.S. Cl.
CPC .............. *B01J 23/52* (2013.01); *B01J 23/72* (2013.01); *B01J 23/745* (2013.01); *B01J 23/755* (2013.01); *C12H 1/165* (2013.01); *C12H 1/18* (2013.01)

(58) Field of Classification Search
CPC . B01J 23/42; C12H 1/165; C12H 1/18; C12H 1/12; C12H 1/16; C12H 1/0408
USPC ......................................................... 426/592
See application file for complete search history.

(56) References Cited

U.S. PATENT DOCUMENTS

| | | |
|---|---|---|
| 3,590,058 A | 6/1971 | Lemaster |
| 2015/0191685 A1 | 7/2015 | Kyle |

OTHER PUBLICATIONS

CN 207079218 (Year: 2018).*
Li-Yun Lin et al., Acceleration of Maturity of Young Sorghum (Kaoliang) Spirits by Linking Nanogold Photocatalized Process to Conventional Biological Aging—a Kinetic Approach, Food Bioprocess Technol, 2008, vol. 1, pp. 234-245.
International Search Report, Application No. PCT/IL2019/050681, dated Sep. 25, 2019, 4 pages.

* cited by examiner

MATURATION SYSTEM AND METHOD

CROSS-REFERENCE TO RELATED APPLICATIONS

The present application is a National Phase Entry of PCT International Application No. PCT/IL2019/050681 which was filed on Jun. 18, 2019, which claims priority to Israeli Application No. 260160, filed Jun. 19, 2018, all of which are hereby incorporated by reference in their entireties.

BACKGROUND

Distilled spirits traditionally were stored and shipped in wood casks as these were the most cost effective and appropriate containers available. Today it is still common in industry to find extensive warehouses filled with liquids being aged in barrels for extended periods of time. Ageing distilled spirits in wood can take many years to provide a desired flavor profile, can lower yield due to evaporation, and does not guarantee a consistent product. Hence there is a current trend to accelerate aging of distilled spirits by various methods.

SUMMARY

According to one aspect methods are provided related to production and improved maturation of distilled spirits of all alcoholic strengths and types to yield a palatable and mature product at least comparable to commercially available products yielded by traditional aging methods and/or systems.

According to another aspect systems and/or devices and/or materials are provided related to production and improved maturation of the distilled spirits comparable at least to products yielded by traditional aging methods and/or systems.

The term "Distilled Spirit" refers to any fermented solution comprised of but not limited to: grains, malted grains, legumes, fruit, sugar cane, distilled at least one time. "Maturation" refers to improving sensory characteristics of any distilled spirit by some process, such as holding the liquid in containers, generally made of wood, usually oak casks, for a period ranging from few days to a significant number of years. The type of material the container is made from (and specifically the type of wood used for a cask or added for the container, if any), charring level of wood (if any), the liquid previously held in said cask or container, the porosity of said container, how many times the cask or container was previously filled, and the amount of time liquid was held in said cask or container all strongly affect the properties of the final aged product.

"Unaged or Partially Aged" refers to distilled spirits which have not yet been matured or have been matured for an amount of time which does not yield a finished product.

The term "catalysis," relates to a reaction occurring with a "catalyst," which accelerates reaction rates without being consumed in the reaction and can act in the reaction repeatedly. In this case the term "catalyst" refers to heterogeneous or homogeneous catalytic materials or mixtures thereof, where "ligand" refers to a molecule or functional group bound to a central metal atom.

"Intermittent electrical resistance pulses" are defined as providing heat pulses to a distilled spirit in time lengths of 0.1 seconds to 600 seconds or more, not necessarily of equal temporal lengths for each subsequent pulse. "Continuous heating" refers to the application of energy without pulses of energy.

"Gaseous or Liquid state" refers to the physical phase in which the distilled spirit is in contact with heating elements/catalytic materials/dispersion system/container or other articles thereof. The distilled spirit can interact with articles in both liquid and/or gaseous phases.

"Dispersion System" refers to a system through which a distilled spirit is passed to provide a physical change to the spirit.

According to a first aspect an improved method of maturation of an unaged or partially aged distilled spirit is provided, the method comprising:

exposing the spirit to at least one catalytic material consisting of a group selected from: iron oxide nanoparticles, alumina-supported Fe(II) complexes, Pd/C, multiwalled carbon nanotubes, carbon xerogels, carbon based solid acid catalysts, $SO_4^{2-}/TiO_2/\gamma-Al_2O_3$, an element selected from the group consisting of: columns 4-12 transition metals except for Fe, column 13 boron group, Si, and mixtures thereof;

wherein throughout the exposing, the spirit is not being distilled, and the exposing is allowed until level of at least one maturation congener in the spirit attains predetermined desired congener level/s in the spirit.

According to a second aspect an improved method of maturation of an unaged or partially aged distilled spirit is provided, the method comprising:

dispersing the distilled spirit in a dispersion system;

exposing the spirit in the dispersion system to at least one catalytic material comprising an element selected from the group consisting of: columns 4-12 transition metals, column 14 carbon group, column 13 boron group, and mixtures thereof;

wherein the exposing is allowed until level of at least one maturation congener in the spirit attains predetermined desired congener level/s in the spirit.

In some embodiments the dispersion system comprises a gaseous environment and the method further comprises controlling content of the gaseous environment.

In some embodiments the columns 4-12 transition metals are selected from a group consisting of Ti, Pt, Cu, Ag, Au, Zn, Ru, Rh, Ir, Pd, Ni, V and mixtures thereof, and/or column 13 boron group is Al.

In some embodiments the columns 4-12 transition metals are selected from a group consisting of Ti, Fe, Pt, Cu, Ag, Au, Zn, Ru, Rh, Ir, Pd, Ni, V and mixtures thereof, and/or column 13 boron group is Al, and/or column 14 carbon group is selected from C and Si.

In some embodiments the at least one catalytic material are in at least one state selected from one of the following states: metal, alloy, ligand and mixtures thereof.

In some embodiments the at least one catalytic material are exposed to the distilled spirit in liquid and/or gaseous phase before the least one maturation congener attains the desired predetermined congener level/s in the spirit.

Some embodiments further comprise continuously applying thermal energy, applying pulses of thermal energy or applying both to the catalytic material and/or the distilled spirit, to affect temperatures of the spirit of between 0° C. and 99° C., and or/at least one catalytic material between 0° and 250° C. before the least one maturation congener attains at least the desired predetermined congener levels in the spirit.

In some embodiments the thermal energy is applied by a heating element comprising the at least one catalytic material.

In some embodiments the heating element comprises a sheath, and wherein the sheath comprises the at least one catalytic material.

In some embodiments the at least one catalytic material comprises copper.

In some embodiments the copper comprises oxides of Cu(I) and Cu(II), oxygen free copper between 99.95% to 99.99% purity and mixtures thereof.

In some embodiments the at least one catalytic material is copper.

In some embodiments the copper comprises oxides of Cu(I) and Cu(II), oxygen free copper between 99.95% to 99.99% purity and mixtures thereof.

In some embodiments the exposing is at least in a main container comprising a material selected from a group consisting of metal, organic material, plastic, glass, ceramics or any mixtures thereof.

Some embodiments further comprise circulating the distilled spirit before the least one maturation congener attains the predetermined desired congener levels in the spirit.

In some embodiments the dispersion system is external to the container.

In some embodiments the distilled spirit is dispersed as an aerosol.

In some embodiments the dispersed distilled spirit is exposed to an external energy source wherein the energy is selected from ultrasonic energy, high shear homogenization, UV, non-ionizing radiation and combinations thereof.

In some embodiments the distilled spirit is temporarily held external to the main container before the least one maturation congener attains the predetermined desired congener levels in the spirit.

In some embodiments the distilled spirit is circulated between the main container and the dispersion system before the least one maturation congener attains at least the predetermined desired congener levels in the spirit.

According to a third aspect an improved maturation kit for obtaining predetermined desired levels of at least one maturation congener in an unaged or partially aged distilled spirit is provided, the kit comprising:
at least one catalytic material comprising iron oxide nanoparticles, alumina-supported Fe(II) complexes, Pd/C, multiwalled carbon nanotubes, carbon xerogels, carbon based solid acid catalysts, $SO_4^{2-}/TiO_2/\gamma-Al_2O_3$, an element selected from the group consisting of: columns 4-12 transition metals except for Fe, column 13 boron group, Si, and mixtures thereof;
the kit not configured to allow distillation of the spirit, and configured to allow: exposing the distilled spirit to the catalytic materials such as to allow changing the level of the at least one maturation congener in the distilled spirit, and continuing the exposure at least until the levels of at the least one maturation congener attain at least the predetermined desired congener levels in the spirit.

According to a fourth aspect an improved maturation kit for obtaining predetermined desired levels of at least one maturation congener in an unaged or partially aged distilled spirit is provided, the kit comprising:
a liquid dispersion system comprising at least one catalytic material consisting of a group selected from:
iron oxide nanoparticles, alumina-supported Fe(II) complexes, Pd/C,
multiwalled carbon nanotubes, carbon xerogels, Carbon based solid acid catalysts, $SO_4^{2-}/TiO_2/\gamma-Al_2O_3$, an element selected from the group consisting of: columns 4-12 transition metals, column 13 boron group, column 14 carbon group, and mixtures thereof;
the kit not configured to allow distillation of the spirit, and configured to allow: exposure of the distilled spirit to the catalytic materials such as to allow changing the level of the at least one maturation congener in the distilled spirit, and continuing the exposure at least until the levels of at the least one maturation congener attain the predetermined desired congener levels in the spirit.

In some embodiments the dispersion system comprises a gaseous environment and the kit comprises means for controlling content of the gaseous environment.

In some embodiments the columns 4-12 transition metals are selected from a group consisting of Ti, Pt, Cu, Ag, Au, Zn, Ru, Rh, Ir, Pd, Ni, V and mixtures thereof, and/or column 13 boron group is Al.

In some embodiments the columns 4-12 transition metals are selected from a group consisting of Ti, Fe, Pt, Cu, Ag, Au, Zn, Ru, Rh, Ir, Pd, Ni, V and mixtures thereof, and/or column 13 boron group is Al, and/or column 14 carbon group is selected from C and Si.

In some embodiments the at least one catalytic material are in at least one state selected from one of the following states: metal, alloy, ligand and mixtures thereof.

Some embodiments are further configured to allow exposing the at least one catalytic material to the distilled spirit in liquid and/or gaseous phase before the least one maturation congener attains the predetermined desired congener levels in the spirit.

Some embodiments further comprise a temperature control system capable of continuously applying thermal energy, applying pulses of thermal energy or applying both to the catalytic material and/or the distilled spirit, to affect temperatures of the spirit to between 0° and 99° C. and or/at the least one catalytic material between 0 and 250° C. before the least one maturation congener attains the predetermined desired congener levels in the spirit.

In some embodiments the temperature control system comprises a heating element comprising the at least one catalytic material.

In some embodiments the heating element comprises a sheath, and wherein the sheath comprises the at least one catalytic material.

In some embodiments the at least one catalytic material comprises copper.

In some embodiments the copper comprises oxides of Cu(I) and Cu(II), oxygen free copper between 99.95% to 99.99% purity and mixtures thereof.

In some embodiments the at least one catalytic material is copper.

In some embodiments the copper comprises oxides of Cu(I) and Cu(II), oxygen free copper between 99.95% to 99.99% purity and mixtures thereof.

Some embodiments further comprise a main container comprising a material selected from a group consisting of metal, organic material, plastic, glass, ceramics or any mixtures thereof, wherein at least one of the at least one catalytic material is in the main container. Some embodiments comprise a kit further configured to allow circulating the distilled spirit before the least one maturation congener attains the predetermined desired congener levels in the spirit.

In some embodiments the dispersion system is external to the main container.

In some embodiments the dispersion system is capable of dispersing the distilled spirit as an aerosol.

Some embodiments further comprising an energy source external to the main container, wherein the energy is selected from ultrasonic energy, high shear homogenization, UV, non-ionizing radiation and combinations thereof.

Some embodiments are further configured to allow temporarily holding the distilled spirit external to the main container before the least one maturation congener attains at least the predetermined desired congener levels in the spirit.

Some embodiments are further configured to allow circulating the distilled spirit between the main container and the dispersion system before the least one maturation congener attains at least the predetermined desired congener levels in the spirit.

DETAILED DESCRIPTION OF EMBODIMENTS

The following embodiments and aspects thereof are described and illustrated in conjunction with systems, tools and methods which are meant to be exemplary and illustrative, not limiting in scope.

Figure 1:
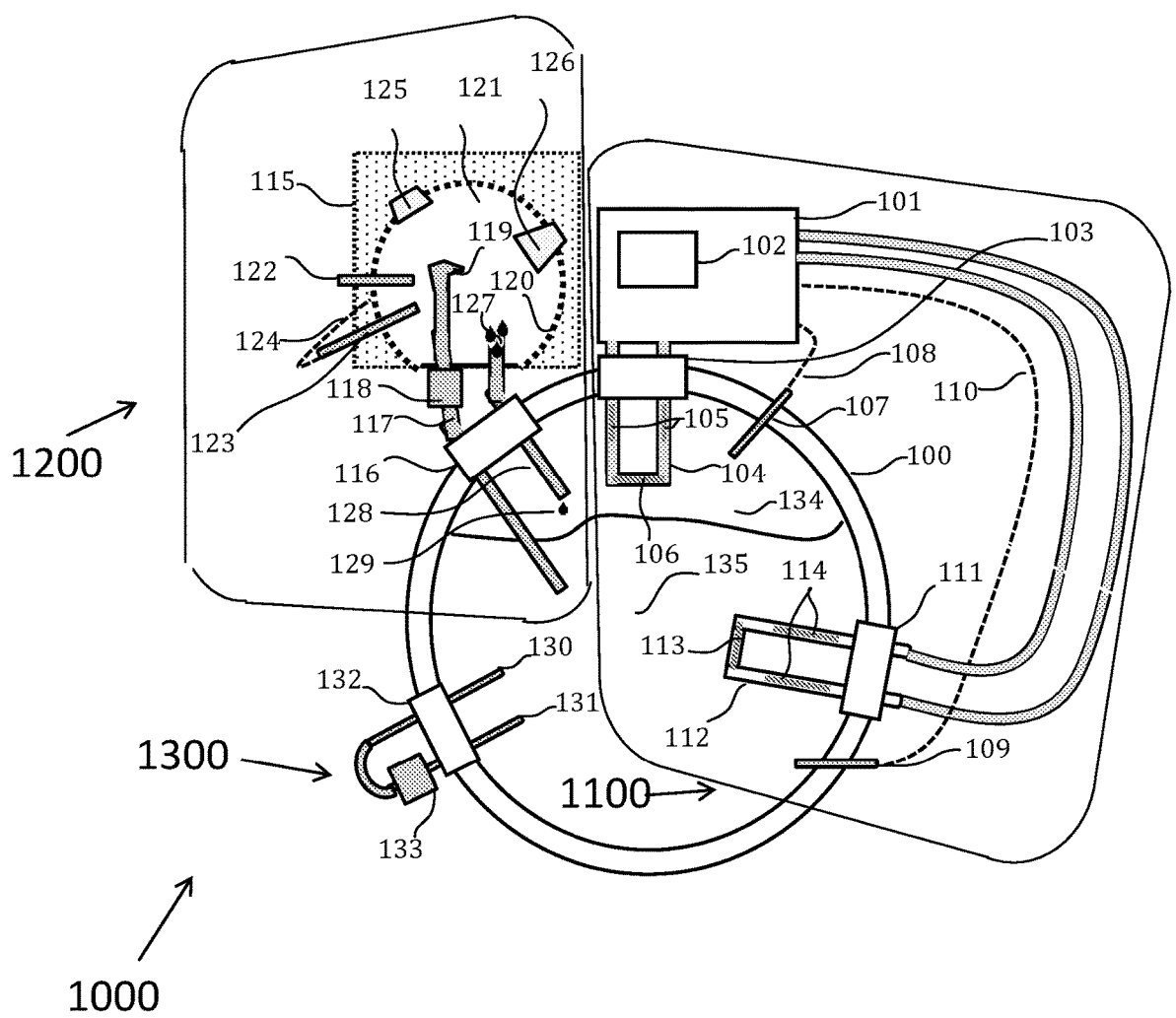
FIG. 1 schematically depicts a proprietary improved ageing system with an external dispersion system and heating and/or catalytic apparatuses placed separately in spaces designated for a spirit head space gas phase and for a liquid phase in a main container.
Figure 2:
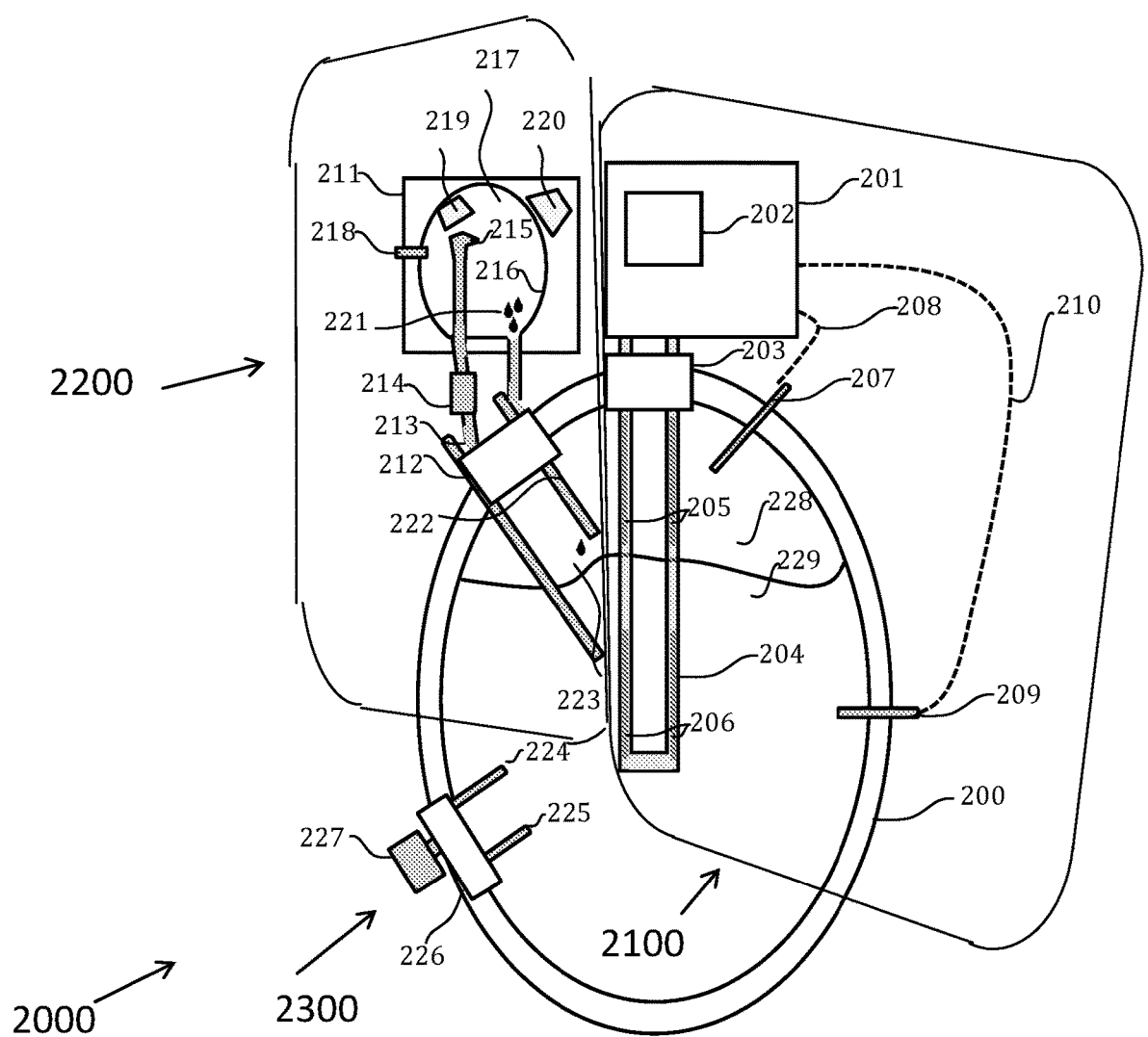
FIG. 2 depicts another proprietary improved ageing system with heating and/or catalytic apparatus/es as a single physical element in a main container, and also with an external dispersion system.
Figure 3:
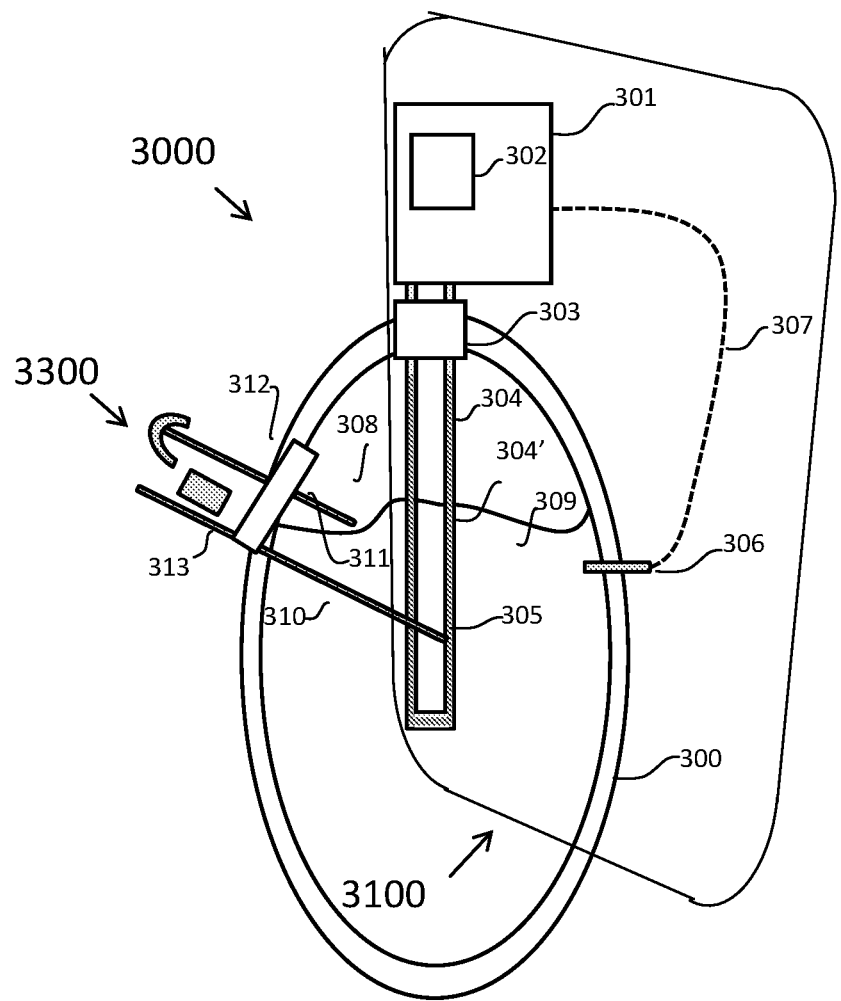
FIG. 3 depicts yet another proprietary improved ageing system with heating and/or catalytic apparatus/es as a single physical element in a main container, but without an external dispersion system.
Figure 4:
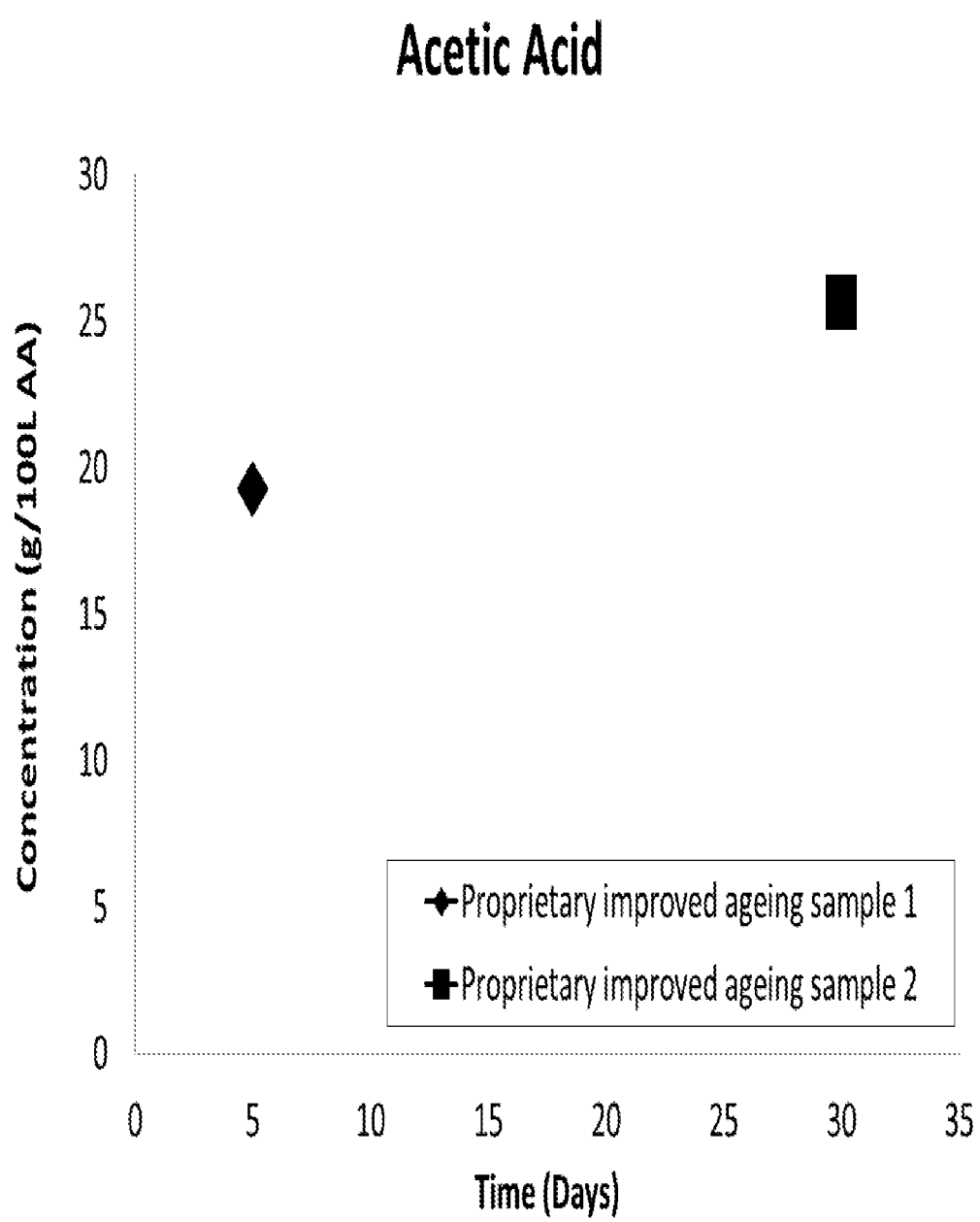
FIG. 4 is a chart plotting concentration of acetic acid over time for two spirit samples prepared according to example 2.
Figure 5:
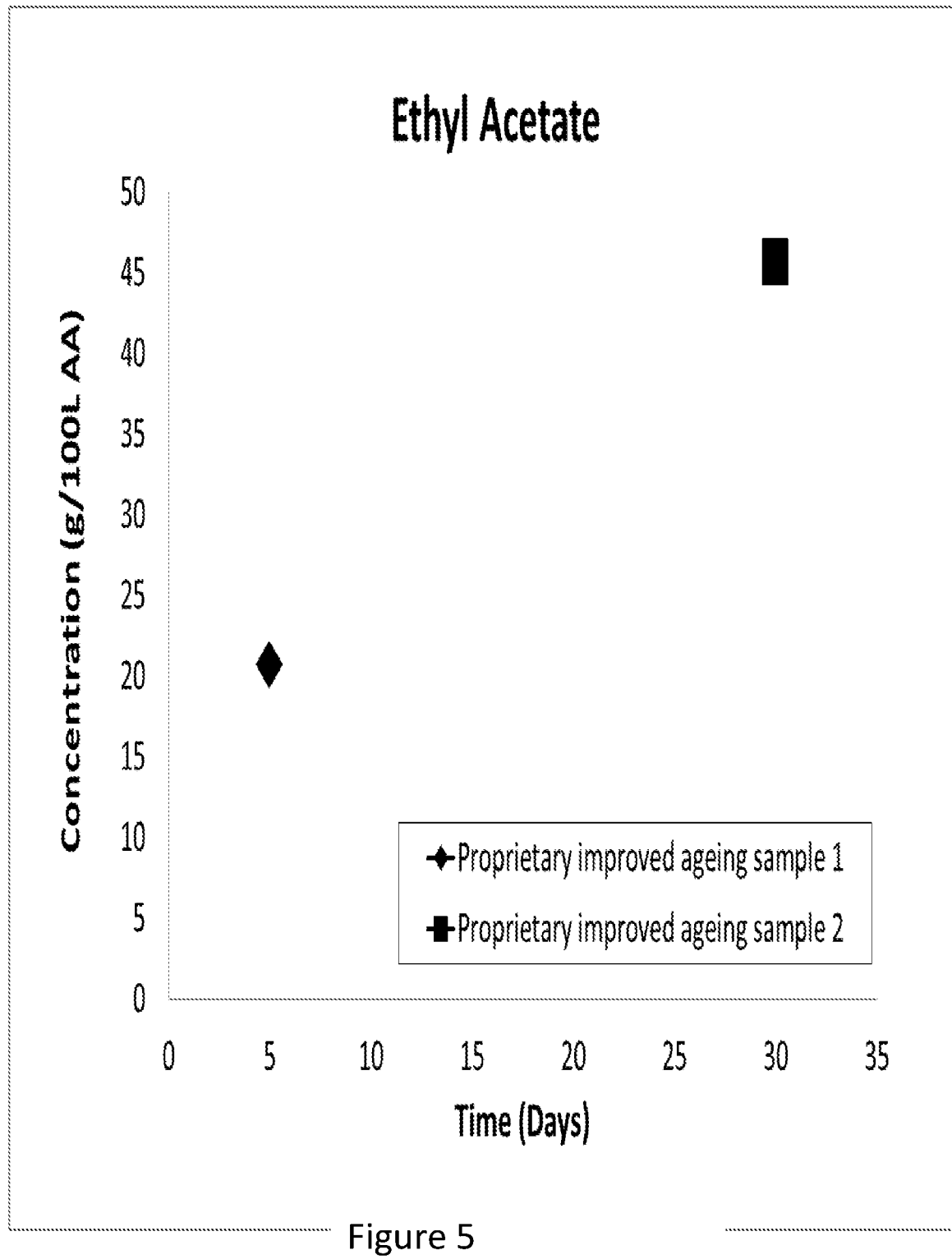
FIG. 5 is a chart plotting concentration of ethyl acetate over time for two spirit samples prepared according to example 2.

FIGS. 1, 2 and 3 schematically depict three proprietary improved ageing kits 1000, 2000 and 3000 respectively.

Features of the proprietary improved ageing systems are described below.

1. Catalyst/s

Metal catalyzed reactions are well known and widely used in chemistry and chemical engineering [Y. Zhu et al., J. Org. Chem. 2013, 78, 9898-9905], [Liu et al., Org. Biomol. Chem., 2014, 12, 2637]. Catalysts may be employed as metals, alloys, or ligands [Zeng et al., https://www.intechopen.com/books/chemical-kinetics/recent-developments-on-the-mechanism-and-kinetics-of-esterification-reaction-promoted-by-various-cat], to accelerate the progress of reactions.

In particular, it has been shown that Cu can double the concentration of common esters found in distilled spirits during distillation [Larson, V. F., Yeast Biotechnology, 1987, 501-531].

Iron oxide nanoparticles have been shown to catalyze esterification reactions for carboxylic acids in the presence of alcohols [Rajabi et al., Materials 2016, 9, 557], alumina-supported Cu(II), Co(II), and Fe(II) complexes can be used as catalysts for esterification [Hossain et al, Bioresources 2018, 13 (3) 5512-5533] and Pd/C catalyzed hydrogenation has been shown to catalyze esterification reactions for carboxylic acids with various alcohols [Aavula et al., Tetrahedron Letters 54 (2013) 5690-5694], and $SO_4$ $2$-$/TiO_2/$ $\gamma$-$Al_2O_3$ has been shown to be effective as a solid acid catalyst for esterification [Yaun et al., Cjche (2018)]

In addition, various carbon based catalysts can be utilized for esterification reactions. Multiwalled carbon nanotubes and carbon xerogels, which exhibit excellent performance as solid acid catalysts for esterification of acetic acid and ethanol [Rocha et al., Catalysis Today 218-219 (2013) 51-56], and carbon based solid acid catalyst was shown to be used as a potential catalyst for esterification reactions [Rathod, 2017 J. Chem. Environ. Vol. 21, 11].

We have discovered that using either a certain single catalyst or a combination of one or more certain catalysts (105, 106, 113, 114 in kit 1000, 205, 206 in kit 2000, 305 in kit 3000), such as columns 4-12 transition metals, column 13 boron group, column 14 carbon group, and any mixtures thereof, after completion of distillation, produced a product with very desirable attributes by substantially enabling changing the level of at least one maturation congener in the distilled spirit. For example, in some embodiments our whisky samples which are 2.5 weeks old get consistent age estimates between 4 and up to 18 years old from professional organoleptic judges. In addition, analytical results strongly indicate that the chemical compositions of our samples are comparable to industry standard whiskies.

Moreover, although in some embodiments the conditions, reactants, and/or reagents significantly differ from the use of catalysts in the above-referenced publications, we hypothesized correctly that metal catalysts would be highly useful in improving ageing processes of distilled spirits.

For example, we have surprisingly discovered that the use of copper post-distillation for proprietary improved aged distilled spirits, as described in further detail below, strongly indicates that the chemical compositions of our samples are comparable to industry standard whiskies The catalyst materials may be in contact with the distilled spirit in liquid or vapor phase or mixtures thereof.

Some other embodiments comprise ceramic membranes as a catalyst. Some ceramic membranes, such as $Al_2O_3$ or zeolite based materials, are known for acceleration of reaction rates for esterification [Bruggen, Handbook of Membrane Reactors, Reactor Types and Industrial Applications Volume 2 in Woodhead Publishing Series in Energy 2013, Pages 107-151], such as enhancement of esterification from acrylic acid with butanol [Emine et al., J. of Polytechnic 2017, 20, 437-440], which is analogous to many reactions that are taking place during distilled spirit aging. However, the referenced membranes have not previously been shown to be effective in relation to reactions taking place during distilled spirit aging.

Certain transition metals, such as Pt, Pd, Ni, Cu, Ag, Au, Ru, Rh, Ir, Pd, Ni, V or mixtures thereof [H. Sellers and E. Shustorovich, Surface Science 356 (1996) 209-221] may react in some conditions with compounds such as sulfur compounds in both the liquid and gaseous phase. We have found that during the aging some catalytic materials, in particular several of the group 8 to 12 transition metals, surprisingly serve in some embodiments both as catalysts and as reactive materials; for example act both as a catalyst for increased reaction kinetics of esterification reactions and as a reactant for the precipitation and/or evaporation of deleterious sulfur compounds. We have discovered that utilizing such catalytic materials may accelerate the maturity and significantly improve the organoleptic properties of the final product compared to traditional methods. These catalytic materials may remove unwanted deleterious sulfur compounds, such as $SO_2$, from the distilled spirit which are converted into less-deleterious compounds, evaporate, are absorbed, adsorbed, and/or precipitate out of solution.

For some embodiments two or more different catalysts may be used in tandem, for a better catalytic effect. For example, in some embodiments there are at least two catalysts, at least one of which contains Fe and at least one that does not contain Fe but one of the non-Fe materials indicated above.

2. Temperature Control

We have discovered that in some embodiments controlling distilled spirit and/or apparatus temperatures while incorporating catalytic materials significantly accelerates aging times and provides a superior product. Temperature may be controlled via multiple heating apparatuses (104, 112, 204, 304), in various locations inside a main container (100, 200, 300) and/or in external containers. Heating apparatuses may be metal or ceramic, porous or impervious, catalytic or non-catalytic or a combination of one or more of materials, and may be in contact with a gas phase/headspace in the headspace area (134, 228, 308) or a liquid phase in a lower area (135, 229, 309) in the main container (100, 200, 300) or both. Thermal energy is supplied to the spirit via a respective heating apparatus (104, 112, 204, 304) either by intermittent electrical current pulses, with an energy output between 0.1 to 1500 W per liter of distilled spirit in the main container, or constant energy output (such as via a conduit) by steam/liquid flow, with a maximum energy output between 0.1 to 15000 W per liter of distilled spirit in the main container 100, 200, 300 until desired pre-determined temperature (0° C. to 99° C.) of the distilled spirit and/or catalytic material 0° C. to) 250° in the container 100, 200, 300 is reached.

Liquid distilled spirit temperature may be monitored by a first thermistor/thermocouple (109, 209, 306) which is connected via a first connector (110, 210, 307) to a control unit (101, 201, 301), and energy may be applied to maintain a desired pre-determined liquid distilled spirit temperature (e.g., 0° C. to 99° C.) via a temperature control apparatus, either by intermittent electrical current pulses or constant energy output by steam/liquid flow.

Gaseous distilled spirit temperature may be monitored by a second thermistor/thermocouple (107, 207) which is connected via a second connector (108, 208) to the control unit (101, 201, 301) and energy may be applied to maintain the desired pre-determined gaseous distilled spirit temperature (e.g., 0° C. to 250° C.) via a temperature control apparatus either by intermittent electrical resistance pulses or constant energy output by steam/liquid flow.

It is possible to heat and/or cool the distilled spirit via a temperature control apparatus with one or more discrete catalytic materials (105, 106, 113, 114, 205, 206, 305) acting as the main thermal energy transfer entity or mixed with non-catalytic materials (such as a metal alloy), or plated on, or adhered to a thermal energy transfer apparatus. It is possible to heat and/or cool the substrate strictly via a singular source or have multiple temperature control sources: one or more catalytic, one or more inert or a mix thereof. As an example: an inert heating element may heat the spirit and a catalytic heating element may provide a different heating profile that may function in parallel.

For example, in heating with a metal heating element: The catalytic material can be a metal sheath (e.g., Pt, Pd, Ni, Cu, Ag, Au, Ru, Rh, Ir, Pd, Ni, V) which conducts heat, or the heating element can comprise an alloy of a non-catalytic and catalytic material, such as but not limited to copper plated on steel, silver plated on nickel, or Pt, Pd, Cu, Ti, Ag, Ag, Ru, Rh, Ir, Pd, Ni, and/or V particles adhered to a surface of a heating element.

In the case of the kit embodiment 1000 schematically illustrated in FIG. 1, the temperature control system 1100 comprises a control unit (101), a front panel (102), gaseous phase thermistors/thermocouples (107) and gas-phase wiring between the control unit (101) and the gaseous phase thermistors/thermocouples (107) (108), liquid phase thermistor/thermocouple (109) and liquid-phase wiring between the control unit (101) and the liquid phase thermistors/thermocouples (109) (110), gaseous phase temperature control apparatus (104) with one or more gas-phase catalytic materials or alloys/mixtures thereof (105, 106) with gaseous phase seal (103), liquid phase temperature control apparatus (112) with one or more liquid phase catalytic materials or alloys/mixtures thereof (113, 114), and a liquid phase seal (111).

FIG. 2 schematically depicts another version of a proprietary improved ageing system, with an external circulation of the distilled spirit. The temperature control system 2100 comprises a control unit (201), a front panel (202), gaseous phase thermistors/thermocouples (207) and gas-phase wiring (208), liquid phase thermistor/thermocouple (209) and liquid-phase wiring (210), temperature control apparatus (204) with one or more liquid-phase catalytic materials or alloys/mixtures thereof (205, 206) and with liquid phase seal (203).

FIG. 3 schematically depicts another version of a proprietary improved ageing system, without an external circulation of the distilled spirit. The temperature control system 3100 comprises a control unit (301), a front panel (302), liquid phase thermistor/thermocouple (306) and wiring (307), temperature control apparatus (304) with one or more catalytic materials or alloys/mixtures thereof (305) for both the gaseous and liquid phase, and a seal (303) between the temperature control apparatus 304 and the main container 300.

3. Main Container

The main container in which the distilled spirit is held may or may not contribute to the quality of the final product. Traditionally containers were wood based, most commonly oak, and prolonged travel/storage times allowed the alcoholic liquid to penetrate the wood and extract favorable attributes over time. Depending on the desired outcome for the particular embodiment the main container (100, 200, 300) used for aging distilled spirit can comprise one or more materials such as organic (e.g., wood based), metal or metal alloy (e.g., stainless steel), ceramics, glass, thermoplastics or mixtures thereof. The material used for the main container may be inert or reactive, porous or impervious, therefore either allowing for chemical interaction between the container and the spirit or preventing chemical interaction between the spirit and external effects.

Some Exemplary Uses are:
- Wood based containers, traditionally utilized for beer, wine, and spirits;
- Stainless steel containers, utilized for aging some wines and for use as storage containers in industry;
- Ceramic jugs, traditionally utilized for aging rice or sorghum spirits;
- Glass, utilized for aging wine in the bottle before consumption; Thermoplastics, ubiquitous in the spirit industry for storage and aging.

4. Liquid Dispersion System

An important component of traditional barrel-aging of distilled spirits is diffusion of oxygen from the external environment into the barrel, which allows for many beneficial redox reactions to occur.

Embodiments may provide oxygenation of the liquid via a dispersion system. Reaction kinetics, for reactions such as esterification, can be increased via an input of external energy (e.g. ultrasonic waves or electromagnetic radiation) to the liquid before and/or during reflux and reintroduction into the bulk liquid in the main container.

In addition, a membrane can be used to further separate molecules and in some embodiments ceramic pervaporation membranes are used via an opening or nozzle instead of convecting the liquid [Bruggen, Handbook of Membrane Reactors, Reactor Types and Industrial Applications Volume 2 in Woodhead Publishing Series in Energy 2013, Pages 107-151].

In some embodiments liquid spirit is drawn from the bulk substrate (135, 229) into the liquid dispersion system (115, 211) via a tube with or without controllable one way valve/s (117, 213) by a pump (118, 214) and is dispersed via an opening (119, 215) into the gaseous environment (121, 217) of an internal container (120, 216).

Not having a one way valve allows introducing various ratios of gasses into the main container 100, 200 while processing the spirit in the dispersion system 1200, 2200.

The gaseous environment (121, 217) of the internal container (120, 216) may be air, an oxygen rich gas, an inert gas, a reacting gas, dry, with varying humidity, or a mixture and is regulated by an inlet/outlet control system (122, 218), which in some embodiments comprises a gas flow control valve and in optional embodiments gas/mass flow meters. This inlet/outlet control system 122, 218 can either be open to the atmosphere, or connected to a gas tank (not shown) to control the internal gaseous environment of the dispersion system, such as a higher ratio of $O_2/N_2$.

The mentioned gas mixtures may be pressurized (0.1 Bar to 250 Bar) or vacuum pressure (0 to $-1^{-4}$ mBar) may be employed via the inlet/outlet control system (122, 218). Gaseous mixtures or pressure changes may directly affect the gaseous headspace phase in the headspace area (134, 228, 308) in the main container (100, 200, 300), via controllable one way valves inside the dispersion system inlet (117, 213) and outlet (128, 222) tubes/pipes. The internal container (120, 216) may be made of organic, metallic, thermoplastic, or ceramic material or combinations thereof, and may be porous or impervious and may have qualities of membranes used for separation of chemical species, or combinations thereof.

Temperature of the gaseous environment (121, 217) is measured by thermistor/thermocouple (123) and the dispersed spirit is condensed under reflux (127, 221) and flows back into the main container (100, 200) via an outlet tube (128, 222) with or without a one way valve and reconstitutes into the substrate as a liquid (129, 223).

We refer now to the kit embodiment 1000 schematically illustrated in FIG. 1.

The dispersion system 1200 comprises an internal container (120), a control unit (115) in operational communication with the internal container 120, a siphon tube (117) with or without a controllable one way valve for drawing distilled spirit from the main container 100 into the internal container 120, a pump (118) for pumping liquid spirit from the main container 100 into the dispersion system 1200 via the siphon tube 117, and a nozzle (119) operationally coupled to the pump 118 and configured to allow effectively dispersing the spirit in the internal container 120. An area of the internal container 120 is designated as an internal gaseous/vacuum environment (121).

The dispersion system 1200 further includes a gas composition and pressure/vacuum inlet/outlet control unit (122) in operational communication with the environment surrounding the internal container 120 and the internal container 120, in particular the internal gaseous/vacuum environment (121), a thermistor/thermocouple (123) in operational communication with the internal container 120, in particular the internal gaseous/vacuum environment (121), wiring (124) connecting the thermistor/thermocouple 123 to the control unit 115, an internal energy source (125) such as an electromagnetic/thermal radiation emitter, an external energy source (126) such as an electromagnetic/thermal radiation emitter, both operationally connected to the thermocouple/thermistor and the internal container 120, a spirit reintroduction tube (128) with or without a controllable one way valve, and a seal (116) sealing the siphon tube 117 and the reintroduction tube 128, preventing leaks between the main container 100 and the internal container 120.

During operation, the dispersion system 1200 produces a reconstituted post-dispersion treatment distilled spirit (129) in liquid or gas form, which drips into the gaseous headspace area 134 in the main container 100. Operation of the dispersion system 1200 on the substrate forms a reflux 127 of dispersed liquid in the internal container 120.

Absence of a one-way valve in the drawing tube 117 allows additional reflux in the pipe 117, whereas a one-way valve prevents backflow of liquid into the main container 100.

Similarly, in the case of the kit embodiment 2000 schematically illustrated in FIG. 2, the dispersion system 2200 comprises a control unit (211), a seal (212) between the dispersion system 2200 and the main container 200, a tube (213) for drawing the distilled spirit into the system 2200 with or without a controllable one way valve, a pump (214) for pumping the distilled spirit into the system 2200, a nozzle (215) for dispersing the substrate, an internal container (216), an area designated for an internal gaseous/vacuum environment (217), gas composition and pressure/vacuum inlet/outlet control unit (218), an internal energy source (219) such as an electromagnetic/thermal radiation emitter, an external energy source (220) such as an electromagnetic/thermal radiation emitter and a spirit reintroduction tube (222) with or without a controllable one way valve. During operation of the dispersion system 2200 on a substrate there is reflux of dispersed liquid (221) and introduction of reconstituted post-dispersion treatment spirit in liquid or gas form (223) into the main container 200.

5. Circulation System

Temperature gradients in liquids create convection cells which mix the solution slowly. However, via convection alone longer heating times are required to reach the desired set temperature of the liquid, and therefore a circulation system can greatly increase the efficiency of heating. In addition, more mixing generally means faster reaction kinetics, and a more homogenous product. A circulation system 1300, 2300, and 3300 is sealed in the main container (100, 200, and 300) by a bung/seal/flange (132, 226, and 312). Liquid spirit is pumped by a pump (133, 227, and 313) via an inlet tube (130, 224, and 310) and back into the bulk liquid substrate out an outlet tube (131, 225) or into the gaseous headspace spirit out an outlet tube (311). Circulation can take place with piping external to the main container (100, 200), as in FIG. 1 or 3, or strictly inside the main container, as in FIG. 2.

Example 1

A kit 1000, as shown in FIG. 1, is provided with a main container (100), preferably a wooden cask, holding a liquid distilled spirit (135). Heating is provided in the gaseous headspace area (134) by a gas-phase heating apparatus (104) using electrical resistance, and in the liquid distilled spirit area (135) by a heating apparatus (112) utilizing constant steam/liquid conduit heating methods, with both heating apparatuses having a body of catalytic material of Pt, Pd, Ni, Cu, Ag, Au or a mixture thereof (105, 106, 113, 114). The heating apparatus (104) exposed to the headspace gaseous distilled spirit in the headspace area (134) is vertically sealed in the cask 100 via a seal (103). Another heating apparatus (112) is fully submerged in the liquid distilled spirit area (135) and sealed in the cask via a seal (111). One thermocouple (109) is placed in the liquid distilled spirit area 135 and another thermocouple (107) is placed in the headspace gas phase area (134) both via fitted holes in the main container (100). Thermocouples 107, 109 and the heating apparatuses 104, 112 are connected to a control unit (101), which supplies the necessary energy/electrical outputs, and has a front panel (102) that allows for system control. One temperature profile is as follows:
  i. The liquid distilled spirit area (135) and the spirit therein is heated by a continuous heating steam/liquid conduit heating apparatus (112) to a pre-determined temperature between 35 to 90° C. via a stepwise heating regimen, preferably of 5° C. steps, until equilibrium is reached.
  ii. The headspace gaseous distilled spirit area (134) and, when there is substrate in the main container 100, the gaseous phase therein, is heated by a heating apparatus (104) utilizing electrical resistance to heat in conjunction with heating the liquid spirit. The heating is by heat pulses (01 second to 600 seconds) which continues with no relation to liquid spirit temperature.
  iii. Once the liquid distilled spirit reaches the desired temperature, pre-determined set temperature is maintained by the thermistor/thermocouple (109) measurements in relation to temperatures set on the front panel (102). Upon reaching the desired equilibrium temperature of the liquid spirit, a pump (118) draws liquid substrate into the liquid dispersion system (1200), via a pipe (117) made of a material selected from one or more of the following: metal, plastic, glass, or ceramic.

Air is supplied by an inlet/outlet control system (122) at atmospheric pressure. Liquid substrate is sprayed out of a nozzle 119 which includes an insert made of a porous material into a porous membranous internal container (120) made of a material selected from one or more of metal, glass, plastic, or ceramics. Energy input is provided by an energy sources (125), (126) comprised of but not limited to: electromagnetic radiation with a wavelength between 380 to 700 nm, located either inside the inner container 120 or outside thereof, to accelerate reaction kinetics of chemical reactions such as, but not limited to, acid catalyzed esterification, and oxidation reactions. The spray refluxes into a liquid (127) and flows back into the cask (main container 100) via a pipe (128). The liquid dispersion system 1200 is sealed in the main container (100) by a seal (116). Circulation of the liquid spirit is performed from the initiation of the heating regime by a pump (133) via an inlet (130) and outlet (131) pipe and the circulation system 1300 is sealed in the main container 100 by a flange (132).

Another embodiment is a kit similar to described in example 1, with an impervious main container (100), such as stainless steel or alumina.

Another embodiment is a kit similar to described in example 1, with a main container (100) comprised of both porous and impervious materials in varying arrangements.

Another embodiment is a kit similar to described in example 1, with heat provided by a first heating apparatus (104) in the gaseous headspace spirit area (134) utilizing constant steam/liquid conduit heating, and a second heating apparatus (112) in the liquid spirit area (135) using electrical resistance heating, both having a body of one or more of a mixture of the same or different catalytic materials (Pt, Pd, Ni, Cu, Ag, Au, Ru, Rh, Ir, Pd, Ni, V) (105, 106, 113, 114).

Another embodiment is a kit similar to described in example 1, utilizing the same heating regime, circulation, and dispersion methods/devices, but with heat provided by a second heating apparatus (112) in the liquid spirit area (135) using electrical resistance or conduit steam/liquid heating and having an inert body (e.g. Stainless Steel 304) (105, 106). Heat provided by a first heating apparatus (104) in the gaseous spirit area (134) uses electrical resistance or conduit steam/liquid heating and has a body of one or more of a mixture of the same or different catalytic materials (105, 106).

Yet another embodiment is a kit similar to described in example 1, utilizing the same heating regime, circulation, and dispersion methods, but with heat provided by a first heating apparatus (104) in the gaseous spirit area (134) using electrical resistance or conduit steam/liquid heating methods, the first heating apparatus (104) having an inert body (113, 114). Heat provided by a second heating apparatus (112) in the liquid substrate area (135) uses electrical resistance or conduit steam/liquid heating, The second heating apparatus (112) has a body of one or more of a mixture of the same or different catalytic materials (113, 114).

Another embodiment is a kit, similar to described in example 1, with means for circulation reintroducing liquid distilled spirit via the gaseous headspace distilled spirit.

Another embodiment is a kit similar to described in example 1, with no circulation.

Another embodiment is a kit similar to described in example 1, with no circulation after reaching desired equilibrium temperature.

Yet another embodiment is a kit similar to described in example 1, with a liquid dispersion system made of impervious materials (115, 120);

Another embodiment is a kit similar to described in example 1, as described above, having no porous insert;

Another embodiment is a kit similar to described in example 1, capable of dispersing the liquid distilled spirit as an aerosol.

Another embodiment is a kit similar to described in example 1, as described above, with the internal gaseous environment comprised of, but not limited to: oxygen concentrations between 0.1% to 100 thereof, air with relative humidity levels between 0 to 100%, a non-oxygen reacting gas, and mixtures thereof;

Another embodiment is a kit similar to described in example 1, with energy input type from the internal energy source (125) differing from the energy input type from the external energy source (126) with inputs independently varying between continuous and intermittent;

Another embodiment is a kit similar to described in example 1, as described above, with no dispersion of the liquid spirit.

Example 2

Similar to the kit 1000 shown in FIG. 1: A kit 2000, as schematically shown in FIG. 2, contains liquid distilled spirit (229) inside the main container 200, possibly a ceramic container holding a liquid substrate (A catalytic apparatus (204) having a body of heat-conducting catalytic material Pt, Pd, Ni, Cu, Ag, Au and mixtures thereof (205, 206) is sealed in the main container via a seal (203) and is partly submerged in the liquid spirit (229) and partly exposed to the headspace gaseous spirit (228).

A pump (214) draws liquid spirit into the liquid dispersion system (2200), via a pipe (213) made of a material selected from one or more of the following: metal, thermoplastic, glass, ceramic, or mixtures thereof. Oxygen is supplied by an inlet/outlet system (218) at varying pressures (50 mBar to 250 Bar). Liquid distilled spirit is sprayed out of a nozzle (215) as an aerosol into a chamber (217) made of an impervious material selected from one or more of metal, glass, plastic, and ceramics (216).

The spray refluxes into a liquid (221) and flows back into the cask via a pipe (222). The liquid dispersion system is sealed in the cask (200) by a flange (212).

Another embodiment is a kit similar to described in example 2, where heat is provided with a heating apparatus (204) utilizing constant steam/liquid conduit heating as the heating method and having a body a material selected from heat-conducting catalytic material (205, 206).

Another embodiment is a kit, similar to described in example 2, where heat is provided with a heating apparatus (204) utilizing constant steam/liquid conduit heating as the heating method and having a body consisting essentially of one or more or mixtures of catalytic material.

Yet another embodiment is a kit, similar to described in example 2, wherein heat is provided with a heating element (204) utilizing constant steam/liquid conduit heating as the heating method and having a body only of one or more or mixtures of heat-conducting reactive material.

Another embodiment is a kit, similar to described in example 2, wherein heat is provided by a heating element (204) utilizing electrical resistance or constant steam/liquid conduit as the heating method and having a body of inert material.

Another embodiment is a kit, similar to described in example 2, wherein heat is provided by a heating element (204) utilizing electrical resistance or constant steam/liquid conduit heating as the heating method and having a part of the body (205) of inert material and part (206) as catalytic material.

Another embodiment is a kit, similar to described in example 2, wherein heat is provided by a heating element (204) utilizing electrical resistance or constant steam/liquid conduit heating as the heating method and having a part of the body (206) inert material and part (205) as catalytic material.

Another embodiment is a kit, similar to described in example 2, comprising means for dispersing the liquid distilled spirit as a spray.

Yet another embodiment is a kit, similar to described in example 2, as described above, comprising an internal gaseous environment comprised of, but not limited to: oxygen concentrations between 1 to 100%, inert gas or mixtures thereof, reactive gas or mixtures thereof, air with humidity levels between 0 to 99%, and mixtures thereof;

Another embodiment is a kit, similar to described in example 2, with an internal energy source (219) and a different external energy source (220) with energy outputs, each independently a continuous or intermittent source.

Another embodiment is a kit, similar to described in example 2, as described above, with no dispersion of the liquid distilled spirit;

Another embodiment is a kit, similar to described in example 2, with no circulation after reaching a desired predetermined equilibrium temperature.

Another embodiment is a kit, similar to described in example 2, with no mechanically induced circulation (any circulation is only a result of convection/composition gradients).

Another embodiment is a kit, similar to described in example 2, with the main container (200) made of stainless steel.

Chemical analysis of samples prepared according to example 2, utilizing dispersion and circulation in ambient air conditions, without a one way valve, with a copper sheath shows the development of maturation congeners in the distilled spirits. FIGS. 4 and 5 shows the difference in concentrations for maturation congeners of samples run for 5 days versus 30 days. Acetic acid and ethyl acetate are known to increase over maturation time for distilled spirits [Reazin, G., Am. J. Enol. Vitic., Vol. 32, No. 4, 1981], and as can be seen in FIGS. 4 and 5 there is an increase in concentration between samples matured for 5 or 30 days prepared according to the current example.

For 56 single malt scotch whiskies it was shown that the concentration of ethyl acetate is between 12 to 66 g/100 L A.A . . . [Aylott et al., J. Inst. Brew. 116 (3), 215-229, 2010] We found that only after 5 days of proprietary improved ageing according to example 2, ethyl acetate concentration was found to be in the range for single malt Scotch whisky, which by law must be at aged for at least 3 years.

Example 3

A kit 3000, as schematically shown in FIG. 3, contains a distilled spirit (309) inside a main container 300, preferably a wooden cask holding a liquid spirit, preferably made of oak. The heating apparatus (304) is sealed in the main container via a seal (303) and is partially exposed to the gaseous headspace spirit (308) and partially exposed to the liquid spirit (309). Heat is provided via the heating apparatus 304 utilizing electrical resistance as the heating method and having a sheath 304' comprising heat-conducting catalytic material or a mixture thereof (305), in particular to this example comprising copper or stainless steel. A thermistor (306) is placed in the upper layer of liquid via a fitted hole in the cask which regulates power supplied to the heating element by the control unit (301), based on pre-set temperatures on the front panel (302). One temperature profile is as follows:

i. The distilled spirit (309) is initially heated from room temperature to between 32 to 73° C. via a stepwise heating pulse regimen (room temperature to 250° C., pulses of a duration of 01 second to 600 seconds or more), using batches of pulses that increase the overall temperature of the spirit in liquid phase by a measured 5° C., until a set equilibrium temperature is reached. Heat is applied in pulses of between 10-180 seconds;

ii. The headspace gaseous spirit (308) is heated in parallel to the liquid spirit;

iii. When equilibrium temperature is reached, heating pulses (01 second to 600 seconds or more) may be employed due to hysteresis in the temperature measured by the thermistor (306) in the liquid spirit (309) in relation to temperatures set on the front panel (302).

Another embodiment is a kit, similar to described in example 3, where heat is provided with a heating apparatus (305) utilizing constant steam/liquid conduit heating as the heating method and having a body of heat-conducting catalytic and/or reactive material or mixtures thereof (305).

Another embodiment is a kit, similar to described in example 3, where heat is provided with a heating element (305) utilizing constant steam/liquid conduit heating as the heating method and having a body solely of heat-conducting catalytic material.

Another embodiment is a kit, similar to described in example 3, where heat is provided with a heating element (305) utilizing constant steam/liquid conduit heating as the heating method and having a body solely catalytic material.

Another embodiment is a kit, similar to described in example 3, where heat is provided with a heating element (305) utilizing electrical resistance or constant steam/liquid conduit heating as the heating method and having a body of inert material.

Another embodiment is a kit, similar to described in example 3, configured to allow circulating of the liquid spirit from the main container holding the liquid spirit (310) and reintroducing back via the gaseous headspace substrate (311) until reaching desired equilibrium temperature.

Another embodiment is a kit, similar to described in example 3, with circulation of the area designated for liquid substrate, i.e., pumping from the liquid substrate (310) and reintroducing back via the gaseous headspace substrate (311) during and after reaching desired equilibrium temperature.

Another embodiment is a kit, similar to described in example 3, with no mechanically induced circulation.

Yet another embodiment is a kit, similar to described in example 3, with a thermistor/thermocouple in the area designated for headspace gaseous phase.

Professional organoleptic testing of a sample prepared according to Example 3 utilizing a stainless steel sheath was described as: strongly woody, pungent, sharp, young. In this embodiment wood based congener extraction was accelerated, but it is apparent that there was less of an effect on the acceleration of esterification reactions, leading to the hedonic description above.

Figure 6:
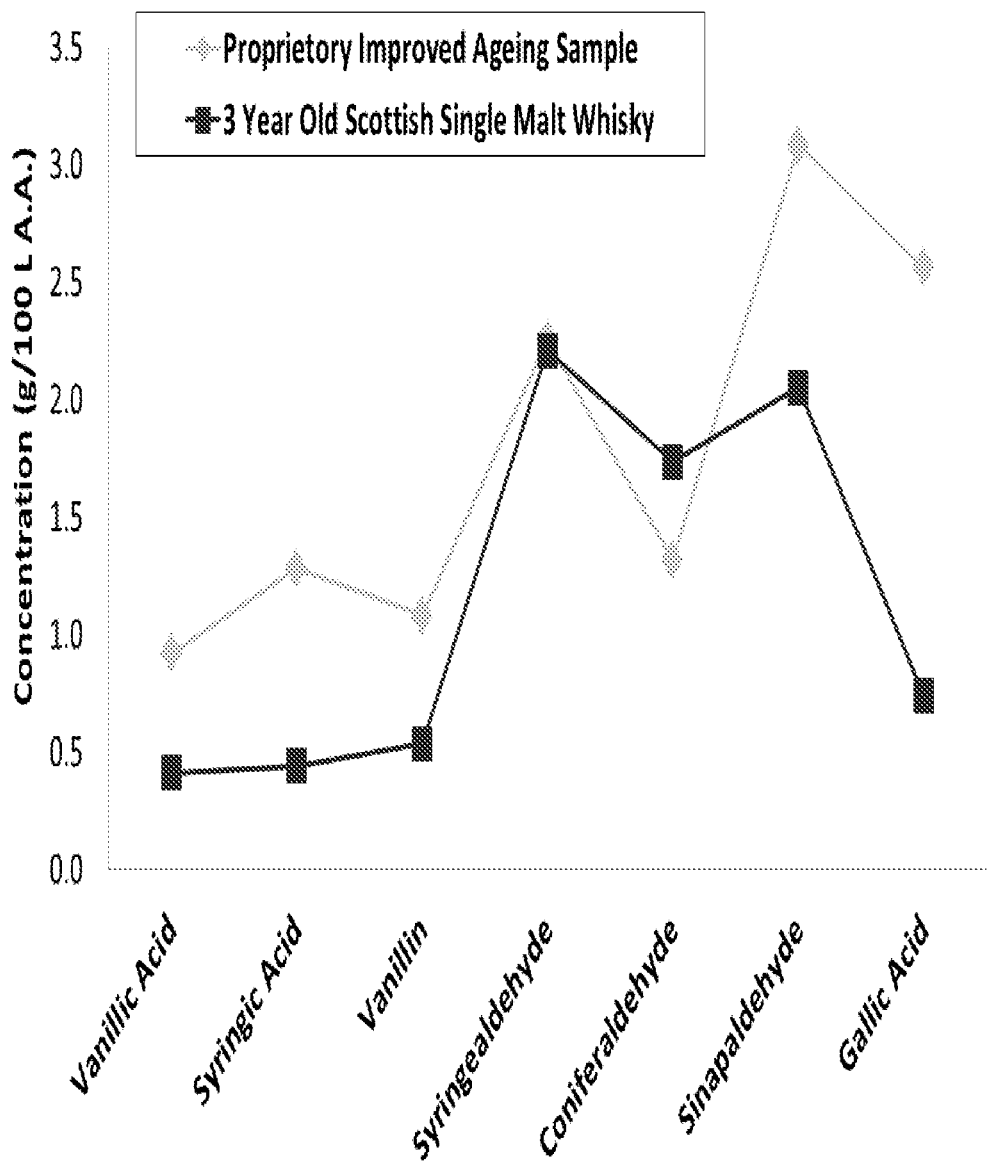
FIG. 6 is a comparison of major maturation congeners in a spirit sample prepared according to Example 3 and commercial Single Malt Whiskies.

Professional organoleptic testing of a sample prepared according to Example 3 utilizing a copper sheath gave results of the prepared proprietary improved ageing single malt whisky recipe comparable to a 4-7 year old, and up to 18 years old traditionally produced single malt whisky. Chemical analysis of major maturation congeners in proprietary improved aged whisky, based on a single malt recipe prepared according to example 3, gave results comparable to commercial Single Malt Whiskies of various ages, as shown in FIG. 6.

At present we believe that these embodiments operate best, but the other embodiments are also satisfactory.

Figure 7:
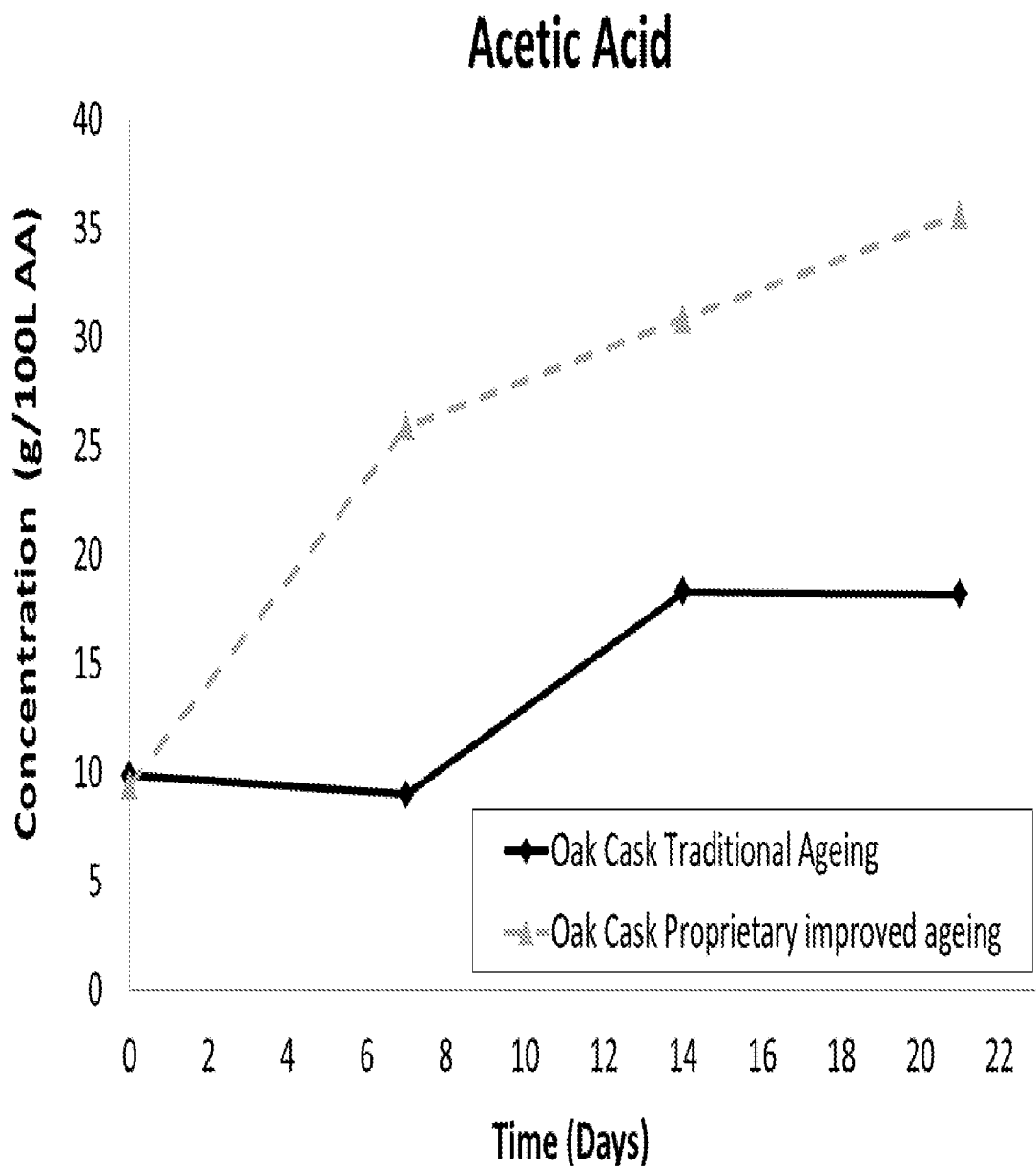
FIG. 7 is a chart plotting concentration of acetic acid over time for a spirit sample prepared according to Example 3 and a traditionally aged spirit.
Figure 8:
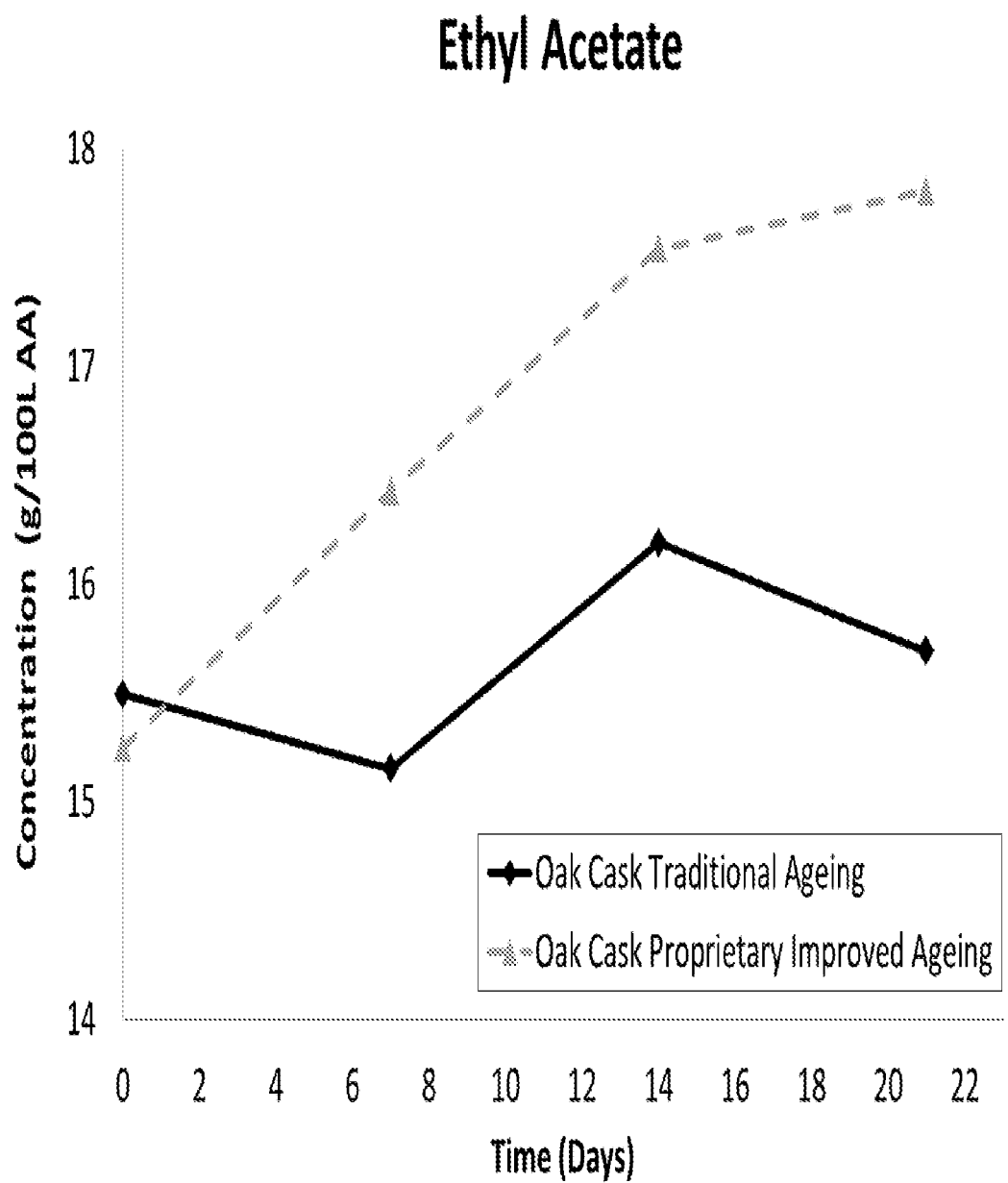
FIG. 8 is a comparison of the concentration of ethyl acetate over time for a spirit sample prepared according to Example 3 and a traditionally aged spirit.
Figure 9:
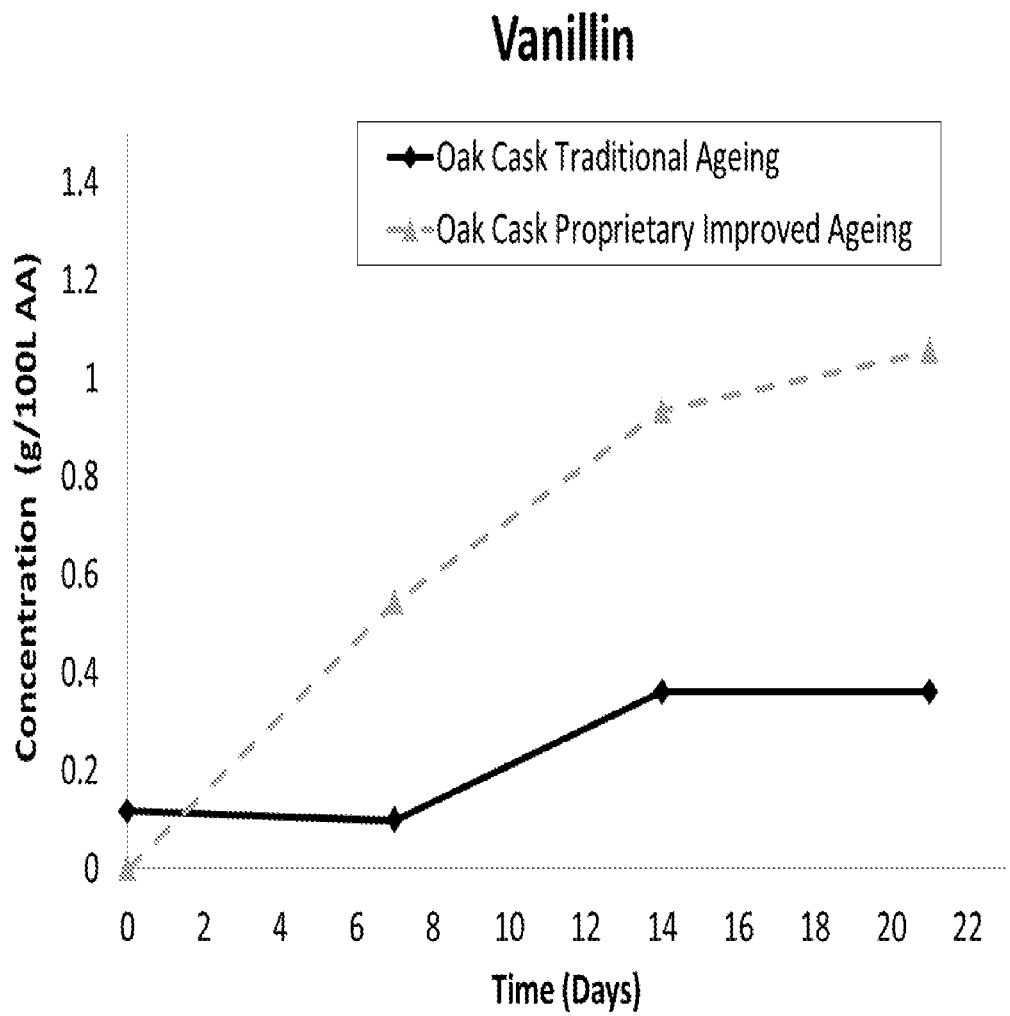
FIG. 9 is a chart comparing concentration of Vanillin over time for a spirit sample prepared according to Example 3 and a traditionally aged spirit.

FIGS. 7 through 9 show concentrations of different maturation congeners over time for proprietary improved ageing spirits samples versus samples utilizing traditional aging, the same distilled spirit was used for each sample. FIGS. 7 and 8 show the desired change in the concentrations of acetic acid and ethyl acetate, respectively, for proprietary improved ageing samples versus traditionally aged samples. FIG. 7 shows the change in acetic acid concentration over time. The traditionally prepared sample concentration initially decreases, followed by an increase, and then decreases again with a total increase of 84%, whereas the proprietary improved ageing sample data show a consistent increasing trend with a total increase of 280%.

For 56 single malt scotch whiskies it was shown that the concentration of ethyl acetate is between 12 to 66 g/100 L A.A. [Aylott et al., J. Inst. Brew. 116 (3), 215-229, 2010]. We surprisingly found that only after 21 days of proprietary improved ageing ethyl acetate concentration was found to be in the range for single malt Scotch whisky, which by law must be at aged for at least 3 years. As can be seen in FIG. 8 the initial concentrations of ethyl acetate for traditionally aged and proprietary improved ageing samples are within the range for single malt scotch whiskies; however, there is not necessarily an increase in the concentration of the traditionally prepared sample as the concentration decreases and increases around the initial measurement, with a total increase of 1.27%, whereas the proprietary improved ageing sample data shows an increasing trend with a total increase of 16.78%. Therefore, using an acceptable measurement tolerance of the analytical equipment is ±1 g/100 L A.A. the observed increase in the control measurement can be considered negligible.

Vanillin is a lignin derivative and common maturation congener found in matured spirits. A significant trend in the increase in concentration of Vanillin in the proprietary improved aged spirit is seen in FIG. 9 versus a traditionally aged sample. For 56 single malt scotch whiskies it was shown that the concentration of vanillin is between 0.4 to 3 g/100 L A.A. [Aylott et al., J. Inst. Brew. 116 (3), 215-229, 2010]. We found that while utilizing the current embodiment only after 8.8 days of proprietary improved ageing vanillin concentration was found to be comparable to 3 year old scotch whiskey, 0.67 g/100 L A.A., and only after 21 days vanillin concentration of the proprietary improved aged sample was found to be comparable to 15 year old single malt Scotch whisky, 1.36 g/100 L A.A.. This shows that the concentration of Vanillin can be manipulated to higher or lower concentrations to produce a variety of flavor profiles.

Figure 10:
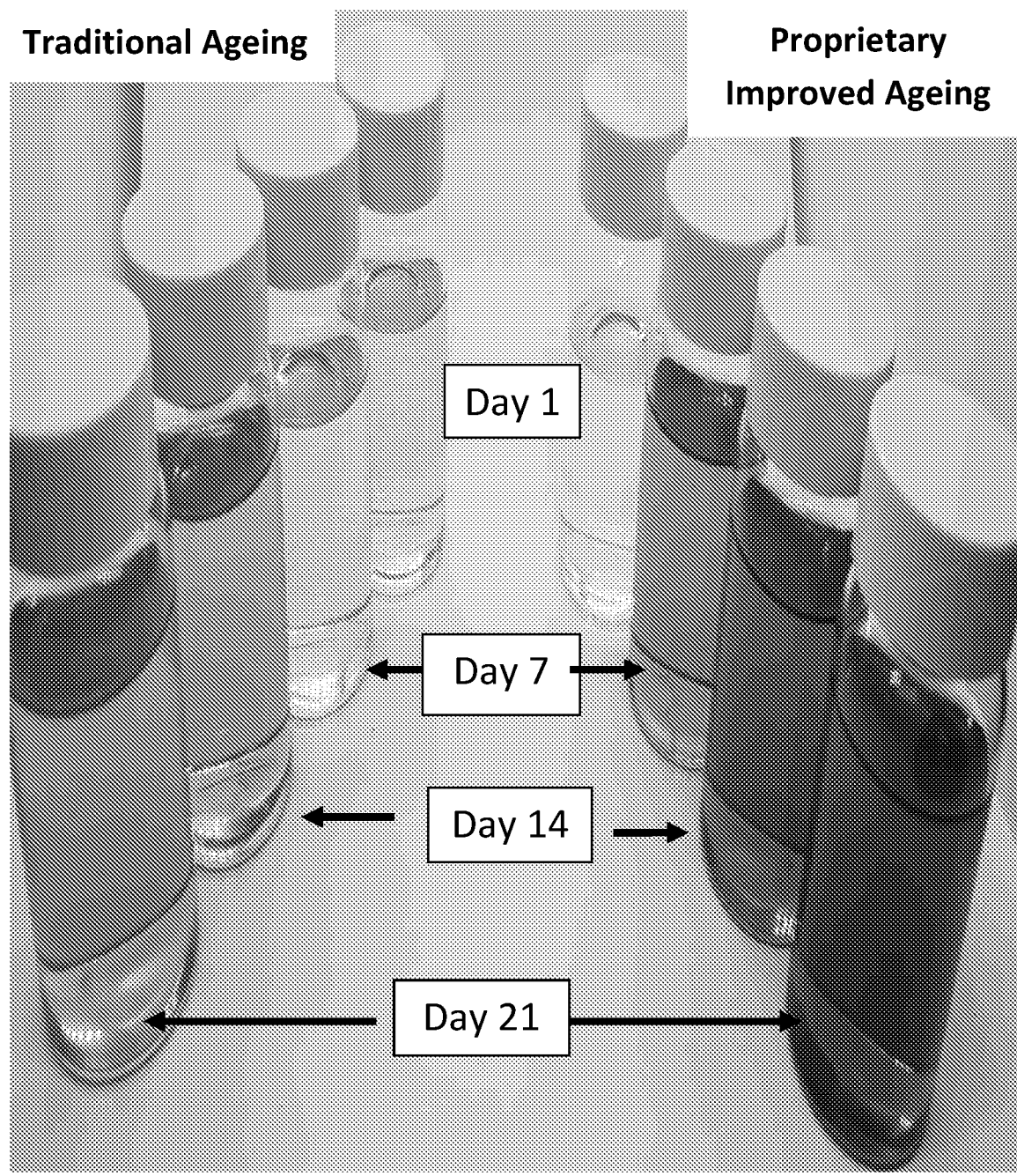
FIG. 10 is a photo comparing traditional aged distilled spirit (Left side) and distilled spirit sample prepared according to Example 3 (right side).

As can be seen in FIG. 10, clear spirits obtain all of their color from lignin derivatives in the wood during aging. As shown in FIG. 9 there is a clear trend in the increase of Vanillin, which reacts from lignin to phenylalanine and cinnamic acid to eugenol and guaiacol, therefore indicating that there is substantial extraction and reaction with wood based congeners, such as furfural, which contribute to spirit color and desirable organoleptic properties.

In some embodiments the system includes means for irradiating the liquid. For example, such means comprises an actinic light source. A method for using such system may involve contacting wood, either as part or detached from the main container with an un-matured distilled spirit under heated conditions and contacting the resulting heat treated spirit with actinic light. In some embodiments a spirit is sequentially processed through heat and actinic light treatment. In some embodiments a heat-treated spirit is mixed with a spirit that has been separately treated with light to give characteristics of a mature spirit.

For example, in some embodiments the treatment of the beverage includes one or more of: heat treatment; light treatment; contact of the beverage with a reactive material, and circulation. In some embodiments one or more of such treatments are concurrent or overlap in their times of being applied.

In certain embodiments ethyl acetate is added to the raw beverage prior to the aging process.

In some embodiments the beverage is first aged in a cask without treatment by one or more of the steps/features described above, and at a selected aging time the beverage undergoes one or more additional treatments described above.

Some embodiments further comprise an insert that can be positioned in the cask to improve the aging of the beverage. The insert may comprise baffle members formed with a plurality of angularly disposed charred surfaces extending substantially from one end of the cask to the other.

In some embodiments a raw distillate, prior to placement in the cask or even after placement, by circulating means such as described above, is treated at a near-boiling temperature with finely divided wood char from which all extractives soluble in boiling alcohol solutions have been essentially completely leached.

In some embodiments the liquid in the cask or along the circulation path is contacted with a mass of charred wood enclosed in a liquid permeable container and/or the gaseous phase is contacted with a mass of uncharred wood enclosed in a gas permeable container.

Such charred wood may be from oak such as white oak (*Quercus Alba*), or other oak species bearing the designation *Quercus*.

In some embodiments accelerating aging further comprises:
  introducing into a main container an ethanol-based solution;
  increasing a specific gas concentration, preferably oxygen, of the ethanol-based solution by introducing an a gas-containing component into the main container; and
  increasing an average kinetic energy of the ethanol-based solution and the gas in the main container for a designated time period.

In some embodiments ethanol-based solution comprises organic material.

In some embodiments the ethanol-based solution comprises a conventionally-aged alcohol.

Some embodiments further comprise introducing organic material into the main container in connection with introducing the ethanol-based solution.

Some embodiments further comprise preparing the organic material by at least one of boiling, cooking, caramelizing, roasting, or charring.

In some embodiments the organic material comprises at least one of wood, extract, fruit, herbs, vegetables, nuts, flowers, meats, or plants.

In some embodiments combining the organic material comprises combining the organic material in a range including at least one of 0.0005 to 100, 2 to 60, 5 to 40, 8 to 30, or 10 to 25 grams of organic material per one and a-half liters of the ethanol-based solution.

Some embodiments further comprise forming a concentrate of a distilled spirit by adding additional organic material to the main container, wherein the concentrate is configured to combine with one or more liquids to form one or more different types of distilled spirits.

Some embodiments further comprise combining a carbon-containing compound including at least one of carbon, charcoal, activated carbon, or activated charcoal. In some embodiments combining the carbon-containing compound comprises combining the carbon-containing compound in a range including at least one of 0.0005 to 100, 2 to 60, 5 to 40, 8 to 30, or 10 to 25 grams of carbon per one and a-half liters of the ethanol-based solution.

In some embodiments introducing an oxygen-containing component into the main container comprises introducing an oxygen-containing gas into main container.

In some embodiments introducing the oxygen-containing gas comprises aerating the ethanol-based solution with oxygen.

In some embodiments introducing an oxygen-containing component into the main container comprises introducing an oxygen-containing gas into main container at a pressure above atmospheric pressure to increase an internal pressure of the main container.

Some embodiments further comprise forming a pressure seal to confine the ethanol-based solution in the main container.

In some embodiments the average kinetic energy is increased by at least increasing a pressure in the main container above atmospheric pressure, heating the ethanol-based solution, mechanically agitating the ethanol-based solution, introducing time-varying electromagnetic fields into the main container, or ultrasonically agitating the ethanol-based solution.

In some embodiments increasing a kinetic energy of the ethanol-based solution comprises increasing a pressure within the main container in a range including at least one of 0.001 to 2,000, 100 to 20,000, 200 to 12,000, 500 to 6,000, 800 to 4,000, 1,000 to 3,000, or 1,500 to 2,500 psig.

In some embodiments increasing a kinetic energy of the ethanol-based solution comprises increasing a temperature of the main container in a range including at least one of 0.001 to 2,000, 100 to 600, 110 to 450, 125 to 300, 140 to 250, 150 to 220, or 160 to 200° F.

According to another aspect a system is provided further comprising:
  a main container configured to receive an ethanol-based solution;
  a gas supply, preferably oxygen, is connected to the main container and configured to introduce an gas-containing main component into the container that increases a gas concentration of the ethanol-based solution; and
  an energy element configured to increase an average kinetic energy of the ethanol-based solution and the gas in the main container for a designated time period.

According to another aspect a system is provided further comprising:
  a reaction vessel;
  a gas source, preferably oxygen, coupled to the reaction vessel;
  a kinetic energy source adapted to engage contents of the reaction vessel, and a controller adapted to:
  introduce an ethanol-based solution into the reaction vessel;
  increase a gas concentration of the ethanol-based solution by introducing a gas-containing component from the gas source into the reaction vessel; and
  increase an average kinetic energy of the ethanol-based solution and the gas in the container for a designated time period with the kinetic energy source.

Some embodiments further comprise an organic material source and wherein the controller is further adapted to introduce an amount of organic material from the organic material source into the ethanol-based solution.

Some embodiments further comprise organic material comprising at least one of wood, extract, fruit, herbs, vegetables, nuts, flowers, meats, or plants.

Some embodiments further comprise a controller further operable to combine the organic material in a range including at least one of 0.1 to 100, 2 to 60, 5 to 40, 8 to 30, or 10 to 25 grams of organic material per one and a-half liters of the ethanol-based solution.

According to another aspect a process for maturing distilled spirits further comprises: providing a distilled consumable alcohol; and subjecting said consumable alcohol to ultrasonic energy at a power of at least about 3 Watts/liter for a time sufficient to alter the chemical properties of said alcohol.

In some embodiments said distilled consumable alcohol is between about 20 proof and about 190 proof alcohol content.

In some embodiments said distilled consumable alcohol is between about 80 proof and about 150 proof alcohol content.

In some embodiments said alcohol is recirculated through a reaction vessel while being subjected to the ultrasonic energy. In some embodiments the alcohol is subjected to ultrasonic energy at a power of at least about 5 Watts/liter.

In some embodiments the alcohol is subjected to ultrasonic energy at a power of between about 10 and about 80 Watts/liter.

In some embodiments said ultrasonic energy is at a frequency of greater than about 35,000 Hz.

In some embodiments said ultrasonic energy is at a frequency of between about 20,000 and about 170,000 Hz.

In some embodiments said consumable alcohol is between about 70 [deg.] F. and about 150 [deg.] F. while the alcohol is being subjected to the ultrasonic energy.

Some embodiments further comprise combining said consumable alcohol with a purifying agent, said purifying agent being a material selected from the group consisting of activated carbon, diatomaceous earth, a filter, and mixtures thereof.

In some embodiments the filter has an average pore diameter of less than about 5 μm.

In some embodiments a process is provided, comprising subjecting said consumable alcohol to ultrasonic energy at a power of at least about 3 Watts/liter for a time sufficient to alter the chemical properties of said alcohol, wherein said consumable alcohol is subjected to the ultrasonic energy for at least about one hour.

In some embodiments said consumable alcohol is subjected to the ultrasonic energy for between about 12 and about 36 hours.

Some embodiments further comprise contacting the consumable alcohol with at least one flavorant.

In some embodiments said flavorant is a solid.

Some embodiments further comprise filtering said solid from said mixture following subjection of said alcohol to said ultrasonic energy.

Some embodiments further comprise subjecting the alcohol to additional ultrasonic energy after filtering the solid from the alcohol.

In some embodiments said flavorant is an extract.

In some embodiments said flavorant is selected from the group consisting of wood, seeds, fruitwoods, nuts, fruits, plants, vegetables, and mixtures thereof.

In some embodiments the alcohol is contacted with the flavorant prior to subjecting the alcohol to ultrasonic energy.

In some embodiments the alcohol is contacted with the flavorant after subjecting the alcohol to ultrasonic energy.

Some embodiments comprise contacting the alcohol and flavorant mixture to additional ultrasonic energy.

In some embodiments the mixture is subjected to the additional ultrasonic energy for a period of time of between about 2 hours and about 4 hours.

According to another aspect a process is provided further comprising:
providing a grain alcohol;
combining the grain alcohol with an accelerator to form a mixture; and
subjecting the mixture to ultrasonic energy at a power of at least about 3 Watts/liter for a time sufficient to alter the chemical properties of the grain alcohol.

The accelerator differs from the catalyst described above, specifically reacts with the beverage alcohol. The accelerator may be selected from a sugar, an organic acid, an ester, a wood extract, or a combination thereof.

The mixture may be recirculated through a reaction vessel while being subjected to the ultrasonic energy.

In some embodiments the mixture is subjected to ultrasonic energy at a power of at least about 5 Watts/liter.

In some embodiments the mixture is subjected to ultrasonic energy at a power of between about 10 and about 80 Watts/liter.

In some embodiments the ultrasonic energy is at a frequency of greater than about 35,000 Hz.

In some embodiments the ultrasonic energy is at a frequency of between about 20,000 and about 170,000 Hz.

In some embodiments the mixture is between about 70 [deg.] F. and about 150 [deg.] F. while the mixture is being subjected to the ultrasonic energy.

In some embodiments the mixture is subjected to the ultrasonic energy for at least about one hour.

In some embodiments the mixture is subjected to the ultrasonic energy for between about 12 and about 36 hours.

In some embodiments the catalyst is selected from the group consisting of sugars, esters, organic acids, wood extracts, and mixtures thereof.

According to yet another aspect, a process is provided further comprising:
providing a consumable alcohol feedstock between about 20 and about 190 proof;
recirculating the alcohol through a reaction vessel; and
subjecting the alcohol to ultrasonic energy while the alcohol is in the reaction vessel, the alcohol being subjected to ultrasonic energy in an amount of at least about 5 Watts per liter for at least about one hour, said ultrasonic energy being at a frequency of between about 35,000 Hz and about 170,000 Hz.

Some embodiments further comprise contacting the alcohol with a purifying agent selected from the group consisting of activated carbon, diatomaceous earth, a filter having an average pore diameter of less than about 5 [mu]m, and mixtures thereof.

In some embodiments the alcohol is at a temperature of between about 70 [deg.] F. and about 150 [deg.] F. while being subjected to the ultrasonic energy.

In some embodiments the alcohol is at a temperature of between about 90 [deg.] F. and about 120 [deg.] F. while being subjected to the ultrasonic energy.

In some embodiments the alcohol is subjected to ultrasonic energy at a frequency of about 80,000 Hz.

In some embodiments the alcohol is subjected to ultrasonic energy for between about 12 and about 36 hours.

In some embodiments the alcohol is subjected to ultrasonic energy in an amount of between about 15 Watts/liter and about 40 Watts/liter.

Some embodiments further comprise contacting the consumable alcohol with at least one flavorant.

In some embodiments said flavorant is a solid.

Some embodiments further comprise filtering said solid from said mixture following subjection of said alcohol to said ultrasonic energy.

Some embodiments further comprise subjecting the alcohol to additional ultrasonic energy after filtering the solid from the alcohol.

In some embodiments said flavorant is an extract.

In some embodiments said flavorant is selected from the group consisting of wood, seeds, fruitwoods, nuts, fruits, plants, vegetables, and mixtures thereof.

In some embodiments the alcohol is contacted with the flavorant prior to subjecting the alcohol to ultrasonic energy.

In some embodiments the alcohol is contacted with the flavorant after subjecting the alcohol to ultrasonic energy.

Some embodiments further comprise contacting the alcohol and flavorant mixture to additional ultrasonic energy.

In some embodiments the mixture is subjected to the additional ultrasonic energy for a period of time of less than about 4 hours.

Some embodiments comprise, in addition to the catalyst/s, at least one catalyst promoter containing materials such as chromium, molybdenum and/or zinc in metallic form and/or as oxides.

In general, the catalysts do not comprise steel or other alloys of iron commonly used in tools.

In general, the catalysts are not part of components previously used in barrels or other containers used for aging distilled spirits, or previously known to be used in aging spirits.

Some embodiments comprise a catalyst comprising nickel, wherein the catalyst may comprise over 10% nickel. Optionally these catalysts also comprise 0.1-10% aluminium. Some embodiments comprise copper, wherein the catalyst may comprise 0.1-99.99% copper. Some embodiments comprise molybdenum, wherein the catalyst may comprise over 10% molybdenum. Some embodiments comprise cobalt and/or manganese and/or niobium, wherein the catalyst may comprise over 1% cobalt and/or manganese and/or niobium each. Some embodiments comprise chromium, wherein the catalyst may comprise over 20% chromium. Some embodiments comprise boron, wherein the catalyst may comprise over 0.1% boron. Some embodiments comprise titanium, wherein the catalyst may comprise over 10% titanium. Some embodiments comprise tungsten, wherein the catalyst may comprise over 20% tungsten.

In some embodiments the liquid distilled spirit is degassed at least at some of the duration of the aging, the degassing may enhance the activity of the catalyst.

According yet another aspect a consumable alcohol is provided, the consumable alcohol comprising:
  a distilled consumable alcohol which has not been aged in an oaken barrel for more than about three years, said consumable alcohol comprising vanillin in an amount greater than about 4.0 mg/L and syringaldehyde in an amount greater than about 8.0 mg/L.

In some embodiments the distilled consumable alcohol has been subjected to ultrasonic energy of at least about 3 Watts/liter.

In some embodiments the consumable alcohol comprises fewer free radicals than an alcohol of the same type which has not been subjected to said ultrasonic energy.

In some embodiments said alcohol is a flavored alcohol.

In some embodiments said flavor is selected from the group consisting of seeds, woods, fruitwoods, nuts, fruits, plants, vegetables, and mixtures thereof.

In some embodiments the alcohol comprises vanillin in an amount of from about 5.0 to about 7.5 mg/L and syringaldehyde in an amount of from about 7.0 and about 15.0 mg/L.

According yet another aspect a consumable alcohol is provided, the consumable alcohol comprising:
  a distilled consumable alcohol which has been subjected to ultrasonic energy, said consumable alcohol comprising at least about 20% less amyl alcohols than a similar distilled consumable alcohol which has not been subjected to ultrasonic energy.

In some embodiment the consumable alcohol further comprises:
  at least about 50% less isobutanol than a similar distilled consumable alcohol which has not been subjected to ultrasonic energy.

In some embodiments said alcohol is a flavored alcohol.

In some embodiments said flavor is selected from the group consisting of seeds, woods, fruitwoods, nuts, fruits, plants, vegetables, and mixtures thereof.

In some embodiments the consumable alcohol comprises fewer free radicals than a distilled alcohol of the same type which has not been subjected to said ultrasonic energy.

In some embodiments said consumable alcohol has been subjected to ultrasonic energy in an amount of at least about 3 Watts/liter.

One skilled in the art will appreciate that the features described above may vary in shape and structure from those shown in the figures but fulfill the same or similar purpose such as to essentially achieve the same results.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

In the description and claims of the present application, each of the verbs, "comprise," "include" and "have" and conjugates thereof, are used to indicate that the object or objects of the verb are not necessarily a complete listing of components, elements or parts of the subject or subjects of the verb.

In the discussion unless otherwise stated, adjectives such as "substantially" and "about" modify a condition or relationship characteristic of a feature or features of an embodiment. The terms are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of, items it conjoins.

Descriptions of embodiments in the present application are provided by way of example and are not intended to limit the scope. The described embodiments comprise different features, not all of which are required in all embodiments. Some embodiments utilize only some of the features or possible combinations of the features. Variations of embodiments of that are described, and embodiments comprising different combinations of features noted in the described embodiments, will occur to persons of the art.

The invention claimed is:

1. A method of maturation of an unaged or partially aged distilled liquid spirit, the method comprising:
   exposing the unaged or partially aged distilled liquid spirit to a temperature below 99° C. in at least one main container comprising a heating element to provide heat to the spirit continuously or in pulses;
   wherein during said period of time, the liquid spirit is not distilled, and the exposing is allowed until a level of at least one maturation congener in the liquid spirit attains a predetermined desired congener level; and
   wherein the heating element comprises at least one catalytic material, or comprises a sheath comprising the at least one catalytic material, and wherein the at least one catalytic material comprises copper or is copper.

2. The method of claim 1, the method comprising:
   dispersing the unaged or partially aged liquid distilled spirit in a dispersion system prior to said exposing.

3. The method of claim 1, wherein the copper comprises oxides of Cu(I) and Cui(II), oxygen free copper between 99.95% to 99.99% purity and mixtures thereof.

4. The method of claim 1, further comprising circulating the distilled spirit before the least one maturation congener attains the predetermined desired congener levels in the spirit.

5. The method of claim 2, wherein the dispersion system is external to the at least one main container.

6. The method of claim 2, wherein dispersing comprises dispersing the distilled spirit as an aerosol.

7. The method of claim 2, wherein dispersing comprises exposing the distilled spirit to an energy source wherein the energy is selected from ultrasonic energy, high shear homogenization, UV, non-ionizing radiation and a combination thereof.

8. The method of claim 1, wherein the distilled spirit is temporarily held external to the at least one main container before the least one maturation congener attains the predetermined desired congener levels in the spirit.

9. The method of claim 2, wherein the distilled spirit is circulated between the at least one main container and the dispersion system before the least one maturation congener attains at least the predetermined desired congener level in the spirit.

10. The method of claim 1, wherein the unaged or partially aged distilled liquid spirit is circulated during maturation.

11. The method of claim 10, wherein circulation of the distilled spirit is by a pump.

12. The method of claim 1, wherein the at least one main container is a wooden cask.

13. The method of claim 12, wherein said wooden cask is made of an oak.

* * * * *